(12) United States Patent
Bayer et al.

(10) Patent No.: US 7,341,618 B2
(45) Date of Patent: Mar. 11, 2008

(54) FILTERS AND METHODS OF MAKING AND USING THE SAME

(75) Inventors: Charlene W. Bayer, Marietta, GA (US); Amy L. Cook, Loganville, GA (US); Mark Rule, Atlanta, GA (US); Victor R. DeJesus, Powder Springs, GA (US); Robert J. Hendry, Smyrna, GA (US); Daniel P. Campbell, Atlanta, GA (US); Srinivas Somayajula, Woodbury, MN (US); Thomas R. Mohs, Eagan, MN (US)

(73) Assignee: Georgia Tech Research Corporation, Atlanta, GA (US)

( * ) Notice: Subject to any disclaimer, the term of this patent is extended or adjusted under 35 U.S.C. 154(b) by 381 days.

(21) Appl. No.: 10/693,602

(22) Filed: Oct. 24, 2003

(65) Prior Publication Data
US 2004/0217049 A1 Nov. 4, 2004

Related U.S. Application Data

(60) Provisional application No. 60/420,984, filed on Oct. 24, 2002.

(51) Int. Cl.
*B01D 53/18* (2006.01)

(52) U.S. Cl. ............... 96/108; 55/318; 55/524; 96/134; 96/135; 96/153; 96/154; 502/402

(58) Field of Classification Search .......... 210/263, 210/501, 502.1, 506, 660, 679, 690–692; 55/315, 318, 524, 527, 528; 95/45, 90, 141, 95/143, 273, 285, 287, 900; 96/4, 135, 153, 96/154, 108, 134; 502/400–402; 521/127–129
See application file for complete search history.

(56) References Cited

U.S. PATENT DOCUMENTS

| 3,538,020 | A | * | 11/1970 | Heskett et al. ............ 210/496 |
| 3,627,703 | A | * | 12/1971 | Kojima et al. ............ 521/27 |
| 3,727,379 | A |   | 4/1973  | Bijleveld et al. |
| 3,876,575 | A | * | 4/1975  | Hayashi et al. ............ 524/744 |
| 3,936,394 | A | * | 2/1976  | Kusunose et al. ......... 502/106 |
| 4,318,714 | A | * | 3/1982  | Kimura et al. ............ 95/49 |
| 4,666,574 | A | * | 5/1987  | Oda et al. ................ 205/524 |
| 4,863,494 | A |   | 9/1989  | Hayes |
| 4,863,495 | A |   | 9/1989  | Rafson |
| 4,892,719 | A |   | 1/1990  | Gesser |
| 5,037,624 | A |   | 8/1991  | Tom et al. |
| 5,281,257 | A |   | 1/1994  | Harris |
| 5,346,535 | A |   | 9/1994  | Kuznicki et al. |

(Continued)

FOREIGN PATENT DOCUMENTS

EP    0 417 407    3/1991

(Continued)

OTHER PUBLICATIONS

Gesser et al., "The Use of Reactive Coatings on Filters for the Removal of Indoor Gaseous Pollutants," *Environmental International*, vol. 18, No. 5, pp. 463-466, 1992.

(Continued)

*Primary Examiner*—Joseph Drodge
(74) *Attorney, Agent, or Firm*—Ryan A. Schneider, Esq.; Troutman Sanders LLP

(57) ABSTRACT

Filters for removing particulate and gaseous organic and inorganic materials from a fluid stream are disclosed. The filter may contain a polymer matrix and optional sequestering agents. Methods of making the filters are also disclosed. Methods of using the filters to remove one or more materials from a fluid stream, such as an air stream, are also disclosed.

12 Claims, 5 Drawing Sheets

U.S. PATENT DOCUMENTS

| | | | |
|---|---|---|---|
| 5,397,626 A * | 3/1995 | Berg et al. | 442/393 |
| 5,529,609 A | 6/1996 | Gooch et al. | |
| 5,627,329 A | 5/1997 | Krishnan et al. | |
| 5,681,788 A | 10/1997 | Kanesaka et al. | |
| 5,702,505 A | 12/1997 | Izumi et al. | |
| 5,830,414 A | 11/1998 | Ishii et al. | |
| 5,891,221 A | 4/1999 | Rohrbach et al. | |
| 5,944,878 A | 8/1999 | Lindhe | |
| 5,948,826 A * | 9/1999 | Terada et al. | 521/27 |
| 5,951,774 A | 9/1999 | Shishiguchi et al. | |
| 6,057,488 A * | 5/2000 | Koper et al. | 588/409 |
| 6,083,439 A | 7/2000 | Nastke et al. | |
| 6,093,236 A | 7/2000 | Klabunde et al. | |
| 6,183,539 B1 * | 2/2001 | Rode et al. | 95/117 |
| 6,187,276 B1 | 2/2001 | Sata | |
| 6,228,135 B1 | 5/2001 | Sugo et al. | |
| 6,352,579 B1 * | 3/2002 | Hirata et al. | 96/134 |
| 6,358,374 B1 | 3/2002 | Obee et al. | |
| 7,022,158 B2 * | 4/2006 | Seguin et al. | 96/134 |
| 2002/0178923 A1 * | 12/2002 | Kishovich et al. | 96/135 |
| 2003/0140785 A1 * | 7/2003 | Koslow | 95/90 |
| 2004/0118287 A1 * | 6/2004 | Jaffe et al. | 96/121 |

FOREIGN PATENT DOCUMENTS

SU         639 582         12/1978

OTHER PUBLICATIONS

Dallüge et al., "Unravelling the Composition of Very Complex Samples by Comprehensive Gas Chromatography Coupled to Time-Of-Flight Mass Spectrometry Cigarette Smoke," *Journal of Chromatography*, vol. 974, Issues 1-2, pp. 169-184, Oct. 2002.

Shaughnessy et al., "Indoor Chemistry: Ozone and Volatile Organic Compounds Found in Tobacco Smoke," *Enviornmental Science & Technology*, vol. 35, No. 13, pp. 2758-2764, Jul. 1, 2001.

Lewis et al., "Properties of Vapor Detector Arrays Formed Through Plasticization of Carbon Black-Organic Polymer Composites," *Analytical Chemistry*, vol. 74, No. 6, pp. 1307-1315, Mar. 15, 2002.

* cited by examiner

FILTERS AND METHODS OF MAKING AND USING THE SAME

RELATED APPLICATIONS

This application claims the benefit of priority to U.S. provisional patent application Ser. No. 60/420,984 filed on Oct. 24, 2002, the subject matter of which is incorporated herein by reference.

FIELD OF THE INVENTION

The present invention is directed to filters for removing particulate and gaseous organic and inorganic materials from a fluid stream. The present invention is further directed to methods of making a filter, and methods of using a filter to remove one or more materials from a fluid stream, such as an air stream.

BACKGROUND OF THE INVENTION

The need for air-filtration systems for improvement of indoor air quality is well recognized, and a substantial industry exists to manufacture, deliver, install, and maintain indoor air filtration systems. In spite of the maturity of this industry, however, there still remains substantial opportunity for improvement of indoor air quality. In particular, most of the air filtration technology developed to date is focused on removal of particulate materials from an air stream, using passive filters constructed from fibrous materials such as glass fibers, which are formed into woven or non-woven mat-like structures. These fibrous air filtration media inherently are ineffective at removal of particulates, gases and/or molecular compounds that are smaller than the pore size created by the interengaged fibers. In addition, there is a natural limit to the size of the particles that can be removed by such filters, since decreasing pore size in this type of filter structure is concomitantly accompanied by an increase in the pressure drop across the filter. Further, these filtration media are inert to other major contributors to indoor air pollution, which are volatile and semi-volatile organic and gaseous inorganic compounds.

The need to remove volatile and semi-volatile compounds from air streams is also recognized in the air-filtration art. Most of the technologies used to date to remove volatile and semi-volatile compounds from an air stream rely on adsorption, as opposed to absorption, as a mechanism for trapping these compounds. Adsorption is a process whereby volatile molecules condense onto a surface of a filtration media. Because essentially only a monolayer of molecules can adsorb, it is necessary to provide very high surface areas in order to achieve significant loadings of the adsorbed compounds. In addition, as adsorption proceeds and the available surface for adsorption decreases, the rate of adsorption also decreases. Moreover, since all adsorbed molecules compete for the same surface sites, the presence of an innocuous adsorbent (such as water) can greatly reduce the capacity of the adsorbent for target volatile compounds. Despite these drawbacks, adsorption is the predominant route chosen to trap volatile organic compounds, primarily because it is considered by those skilled in the art to be the only method that has a kinetic rate great enough to be effective for removing significant levels of pollutants from an air stream.

What is needed in the art is a filter media that overcomes one or more of the above-mentioned deficiencies associated with known filter media. Further, what is needed in the art is a filter media that absorbed one or more materials from a fluid stream, and exhibits a desirable filtering load capacity compared to known filter media.

SUMMARY OF THE INVENTION

The present invention addresses some of the difficulties and problems discussed above by the discovery of a filter media that adsorbs and then absorbs one or more contaminants from a fluid stream, and exhibits a desirable absorption capacity compared to known filter media. In one exemplary embodiment of the present invention, the filter media has an absorption capacity of at least 0.01 grams of captured contaminants, and in some cases up to about 2.5 grams of captured contaminants or more, per gram of absorptive system material within the filter media. The filter media desirably comprises an absorptive system containing a polymer matrix, which is substantially free of polymer crosslinking, and one or more reactive additives within the polymer matrix. The polymer matrix desirably comprises a polymer having a diffusivity of greater than $10^{-8}$ cm$^2$/sec, a $T_g$ of less than about 25° C., and has biostatic properties (i.e., prevents microbial and fungal growth, as well as, kills microbes).

In one exemplary embodiment of the present invention, the filter media comprises (a) a polymer matrix substantially free of crosslinking, wherein the polymer matrix contains at least one polymer selected from the group consisting of poly(acrylamide), polyethylene/polypropylene random copolymers, poly(dimethylsiloxane), styrene-butadiene random and block copolymers, and poly(vinyl chloride) plasticized with dioctyl phthalate; and (b) one or more additives distributed within the polymer matrix.

In a further exemplary embodiment of the present invention, the filter media comprises (a) a polymer matrix substantially free of crosslinking, wherein the polymer matrix contains at least one polymer having (i) a diffusivity of greater than $10^{-8}$ cm$^2$/sec, and (ii) a $T_g$ of less than about 20° C.; (b) one or more additives distributed within the polymer matrix, wherein the one or more additives are selected from the group consisting of a strong acid, a weak acid, a strong base, a weak base, a primary amine, a transition metal, a transition metal salt, and combinations thereof; and (c) has biostatic properties.

The present invention is further directed to methods of making filter media. The method of making a filter media of the present invention may comprise forming a sorbent matrix material, wherein the sorbent material comprises one or more polymeric matrix materials substantially free of crosslinking. The method of making a filter media of the present invention may further comprise one or more additional steps, such as incorporating one or more reactive additives and/or non-reactive additives into and/or onto the one or more polymeric matrix materials.

The present invention is also directed to methods of using a filter media to remove one or more contaminants, particles or compounds from a fluid stream. The method may be used to remove one or more volatile or semi-volatile compounds and/or particles from a fluid stream. The method may comprise bringing a fluid stream and a filter media into contact with one another. The contacting step may simply require the fluid stream to contact a portion of the filter media, or may comprise passing the fluid stream through a portion of the filter media.

Filter media of the present invention may be designed to remove trace amounts of specific contaminants or compounds from a fluid stream and/or significant amounts of specific contaminants or compounds from a fluid stream. Filter media of the present invention may be used in a variety of applications including, but not limited to, industrial applications, commercial applications, military applications (e.g., to combat chemical warfare agents), and household applications.

These and other features and advantages of the present invention will become apparent after a review of the following detailed description of the disclosed embodiments and the appended claims.

BRIEF DESCRIPTION OF THE FIGURES

FIG. 3b depicts a schematic of an exemplary 30.5 cm (1 foot)×30.5 cm (1 foot) duct assembly for use in a filter testing apparatus as shown in FIG. 3a;

DETAILED DESCRIPTION OF THE INVENTION

Figure 1A:
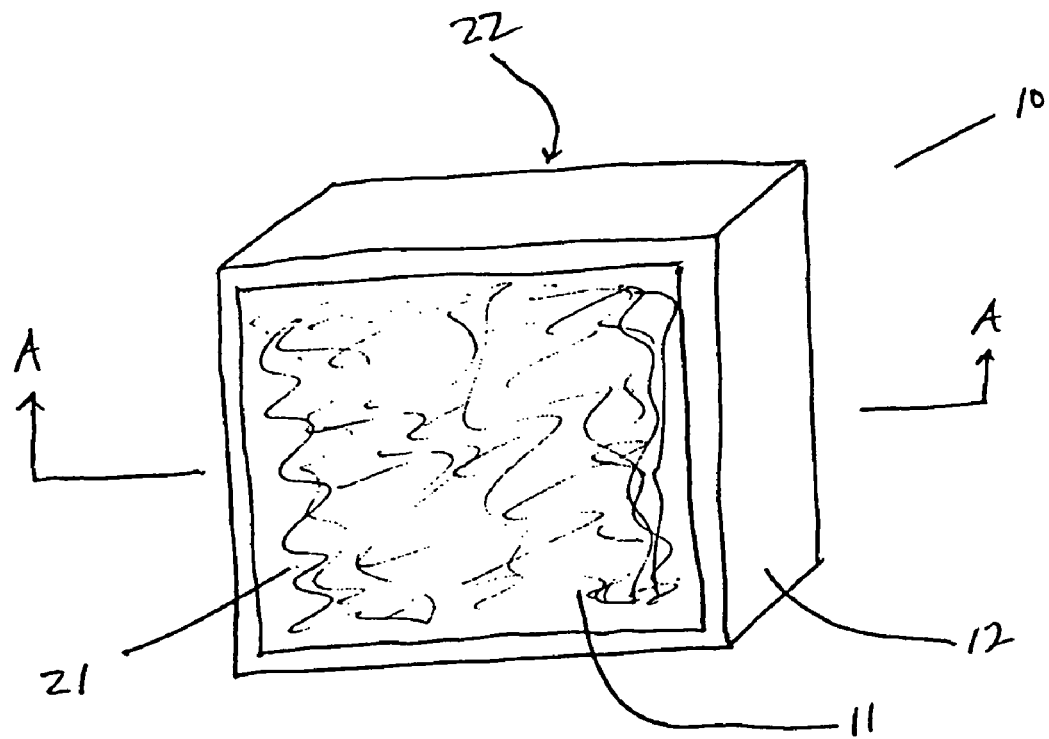
FIG. 1a depicts an exemplary filter media of the present invention.

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to filter media, which may be used to remove a variety of contaminants from a fluid stream, such as an air stream. The filter media of the present invention comprise a number of components resulting in a filter media, which possesses desired absorption properties. Unlike most known filtration media, the filter media of the present invention utilizes absorption technology, as opposed to adsorption technology.

I. Filter Media Characteristics

A. Filter Properties

The filter media of the present invention has one or more of the following filter properties, which distinguish the filter media of the present invention from known filter media.

1. Ability to Absorb One or More Contaminants from a Fluid Stream

The filter media of the present invention are capable of absorbing one or more contaminants from a fluid stream. A description of absorption versus adsorption is given below.

Absorption and adsorption are both thermodynamic processes, in that equilibrium is reached between the concentration of a species X present in the vapor state, and the concentration of the same species X in a condensed state. In adsorption, the thermodynamic driving force for condensation is the heat of adsorption. The total amount of adsorption that can occur is fundamentally limited by the available surface area of a given adsorption material. In addition, adsorption typically follows Langmuirian behavior, as per equation (1):

$$S_1/S = b_1 P_1/(1 + b_1 P_1 + b_2 P_2 + \ldots) \quad (1)$$

wherein $b_1 = 1/$(heat of adsorption of species 1); $P_1 =$ vapor pressure of species 1; and $S_1/S =$ fraction of surface area covered by species 1. Consequences of this behavior include a vapor concentration dependence on the capacity of an adsorbent (with lower vapor concentration leading to lower degrees of adsorption); a temperature dependence on the capacity of an adsorbent (with higher temperatures leading to lower degrees of adsorption); a rapid drop-off in capacity at even low levels of surface coverage (especially for weakly adsorbed species); and a competition for adsorption sites by different vapor species.

Moisture is particularly deleterious to adsorption processes, since water is highly condensable, is pervasive, and is present in high concentrations relative to the concentrations of the species that are to be removed. Because of these phenomena, adsorption processes possess inherent limitations. However, despite these limitations, adsorption is the predominant method used for removal of volatile compounds from an air stream, because it is generally regarded as the only method, which is kinetically fast enough to achieve meaningful reductions on one-pass contact of with an air stream.

To deal with the fundamental requirement of a surface to condense onto, technologies have been developed to create solids with very high surface areas. However, manufacture of such materials is tedious, expensive, and produces a limited variety of shapes (typically beads or powders), which must be further processed to create the final physical form of the adsorbent. Where the desired form is webs, sheets, or screens, the adsorbents often have to be physically adhered to the surface of a support structure.

Absorption into polymeric materials exhibits the same Langmuirian behavior as adsorption, but with some notable differences. First, as a permeant absorbs into the free volume of a medium, the medium will expand, thus creating more free volume. A consequence of this behavior is that the available free volume is dynamic, and thus inherently more tolerant to the presence of sorbed species. A second feature of absorption is that, because the sorption process occurs throughout the bulk of the medium, there is no inherent need to create high surface area solids or structures. A third feature of absorption is that absorption occurs in the free volume of the absorbing medium. Since the amount of this free volume is determined by the chemical composition of the medium, rather than the details of the manufacturing process, there are no fundamental limitations to the shape of an adsorption media, and variations in process conditions to create that media will have minimal impact on the capacity of the media.

The filter media of the present invention is capable of absorbing a variety of contaminants from a fluid stream, such as an air stream. The filter media may be used in an industrial setting, to combat chemical warfare, of in any other application requiring the removal of one or more contaminants from a fluid stream. Examples of contaminants that may be removed from a fluid stream using the filter media of the present invention include, but are not limited to, 2-vinylpyridine, nicotine, ammonia, toxic industrial chemicals, cresols, acetaldehyde, ethenylpyridines, pyridine, chlorine, pyrrole, pyridine, environmental tobacco smoke, sulfur oxides, nitrogen oxides, amines, carboxylic acids, inorganic acids, and chemical warfare agents.

2. Ability to Convert Absorbed Contaminant into a Non-Volatile Reaction Product

In some embodiments of the present invention, the filter media is also capable of converting one or more absorbed contaminants into non-volatile reaction products. Reactive additives or reagents may be combined with the sorbent material (e.g., a polymer matrix), such that sorbed species react chemically with the reactive additives. Alternatively, or additionally, reagents may be photons, such as in the form of UV light. For this later approach to be applicable for an adsorption process, the adsorbed volatile species and the reagent (i.e., photons) must both be present on the surface of the adsorbent. In addition, the reactions generally available are limited to ones that can occur in the vapor phase.

In the case of absorption, however, there is no requirement for reactant (i.e., sorbed contaminant) and reagent (i.e., reactive additives and/or photons) to both be located on the surface of the absorbent, since diffusion through the bulk of the absorbent can permit contact and reaction to occur. Moreover, there is a much wider range of possible chemical reactions that can be employed than with adsorption, since the chemistries available are those that occur in liquid media. Thus, in addition to oxidation reactions, which are known to occur on surfaces, hydrolysis reactions, acid/base reactions, condensation reactions, nucleophilic reactions, and electrophilic reactions, all of which occur in liquid media, may occur in the absorption-based filter media of the present invention.

3. Ability to Absorb a Relatively Large Amount of Contaminants

The filter media of the present invention desirably has an absorption capacity, which enables extended use of the filter media during a given application. Desirably, the filter media of the present invention possesses an absorption capacity of at least 0.01 grams of captured contaminants per gram of absorptive system material (i.e., polymeric matrix material with additives). One method of determining the amount of captured contaminants is described below in the "Test Method" section of the examples.

In some embodiments of the present invention, the filter media possesses an absorption capacity of up to about 2.5 or more grams of captured contaminants per gram of absorptive system material (i.e., polymeric matrix material with additives) within the filter media (in some cases up to about 7.0 grams of captured contaminants per gram of absorptive system material). Typically, the filter media possesses an absorption capacity of from about 0.01 grams to about 0.2 grams of captured contaminants per gram of absorptive system material (i.e., polymeric matrix material with additives) within the filter media.

In addition to having a relatively large absorption capacity, the filter media of the present invention also possess an absorption efficiency for a given contaminant of as much as 99%.

4. Ability to Retain and Bind Water

The filter media of the present invention also has the ability to retain and bind water even when the filter media is exposed to a low humidity environment. The water present within the filter media may be free water (i.e., unbound water), bound water, or a combination thereof. One exemplary method of measuring the water retention factor of a given filter media is described in the "Test Method" section of the examples below and is entitled "Water Retention Test."

In one embodiment of the present invention, the filter media has a total water content (i.e., free water combined with bound water) of at least about 5 percent by weight based on a total weight of the absorptive system material (i.e., polymeric matrix material with additives excluding water). The total water content (i.e., free water combined with bound water) of the filter media of the present invention may be greater than about 10 (15, 20, 25, 30, 35, 40, 45, 50, or more) percent by weight based on a total weight of the absorptive system material (i.e., polymeric matrix material with additives excluding water).

In one desired embodiment of the present invention, the filter media has a total water content of at least about 34 percent by weight based on a total weight of the absorptive system material (i.e., polymeric matrix material with additives excluding water), wherein about 23 percent by weight of the water is free water, and 11 percent by weight is bound water, based on a total weight of the absorptive system material (i.e., polymeric matrix material with additives excluding water).

5. Ability to Act as a Biostat

The filters of the present invention also act as a biostat. As used herein, the term "biostat" refers to a material or object that not only prevents microbial and fungal growth, but also kills microbes. The filters of the present invention are biostat materials due to their ability to prevent microbial and fungal growth within the filter, but also kill microbes that come into contact with the filter. Unlike some known filters, the filters of the present invention do not need biocides or anti-microbial agents added to the filters in order to provide biostat characteristics to the filter.

B. Filter Components

The filter media of the present invention comprises one or more of the following components: a sorbent material, such as a polymer matrix; one or more optional additives, such as reactive additives and non-reactive additives; an optional substrate for supporting the sorbent material and/or optional additives; and an optional containment device for encompassing one or more of the filter components. A description of each filter component is provided below.

1. Absorptive System

As used herein, the term "absorptive system" is used to describe the materials for forming the absorbing component of the filter media of the present invention. The term "absorptive systems" includes sorbent material and any additives combined with the sorbent material. The term "absorptive systems" does not include an optional substrate or any optional housing. Suitable exemplary absorptive systems are described below.

a. Sorbent Material

The sorbent material used to form the absorptive system for the filters of the present invention is desirably a polymer matrix comprising one or more polymeric materials. Desirably, the polymer matrix is substantially free of polymer cross-linking or completely free of polymer cross-linking. As used herein, the phrase "substantially free of polymer cross-linking" refers to a polymer matrix having no cross-linking between polymer chains or a negligible amount of cross-linking within the polymer matrix. The phrase "substantially free of polymer cross-linking" is also used to refer to a polymer matrix, wherein the polymer matrix is formed without the use of cross-linking agents or any other polymerization reaction component that results in polymer cross-linking.

A variety of polymers may be used to form the sorbent material of the filter media of the present invention. It has been determined through computer modeling of the absorptive air filtration phenomenon, that polymeric materials having a diffusivities of at least $10^{-8}$ cm$^2$/sec achieve significant single pass reductions in volatile compounds contained within an air stream. Further, it has been determined that polymeric materials that possess a glass transition temperature, $T_g$, lower than about room temperature (i.e., about 20° C.) possess increased capacity for sorption of volatile compounds, and simultaneously exhibit a reduced sensitivity of molecule size on diffusion constants. Thus, these two criteria (i.e., diffusivities greater than about $10^{-8}$ cm$^2$/sec and $T^g$ less than about 20° C.) serve as one desired method of selecting polymer matrices particularly suitable for use as absorption media.

A number of commercially available polymers meeting the two desired criteria above may be employed as absorbents for air stream contaminants in the filter media of the present invention. Examples of suitable polymer matrices include, but are not limited to, polyethylene/polypropylene random copolymers, poly(dimethylsiloxane), styrene-butadiene random and block copolymers, and the like. The two desired criteria above may also be met by plasticizing a number of other commercially available polymeric systems, such as poly(vinyl chloride) plasticized with dioctyl phthalate, poly(acrylamide) plasticized with water and/or glycerol, and the like. Because of the low glass transition temperature of these materials, the materials are inherently flexible. In addition, they generally exhibit excellent adhesive properties. This property allows them to inherently retain particulate materials that come into contact with their surfaces, thus providing a second function of removing particulate material contained in an impinging air stream. Moreover, since this adhesive process occurs at the molecular level, it is not limited by particle size, and can effectively trap and retain a wide range of particle sizes, including particles too small to be trapped by existing fiber-mat based filtration technologies.

Desirably, the polymer matrix of the filter media comprises at least one polymer having (i) a diffusivity of greater than $10^{-8}$ cm2/sec, and (ii) a glass transition temperature, $T_g$, of less than about 20° C. In an exemplary embodiment of the present invention, the polymer matrix comprises one or more polymeric materials, wherein each polymer has (i) a diffusivity of greater than $10^{-8}$ cm$^2$/sec, and (ii) a $T_g$ of less than about 20° C.

As described above, there are a number of suitable polymers for use as the sorbent material in the filter media of the present invention. Other suitable polymers for use as the sorbent material in the filter media of the present invention include, but are not limited to, polymethacrylates, polysaccharides, polyethylene glycols, polyphosphonates, polyphosphates, poly(glycolic acid), and poly(lactic acid). Desirably, the polymer matrix comprises a high molecular weight poly(acrylamide) having a weight average molecular weight ranging from about 1 million to about 50 million. In other desired embodiments of the present invention, the polymer may be plasticized with a plasticizing agent such as water, glycerol, or a combination thereof.

The absorptive system used to form filters of the present invention may comprise one or more of the above-described polymers for use as the sorbent material. In one exemplary embodiment of the present invention, the absorptive system used to form filters of the present invention comprises one or more of the above-described polymers in combination with one or more optional additives described below. Typically, the absorptive system used to form filters of the present invention comprises from about 5 percent by weight (pbw) to about 95 pbw of one or more of the above-described polymers in combination with from about 95 pbw to about 5 pbw of one or more optional additives, based on a total weight of the absorptive system. Desirably, the absorptive system used to form filters of the present invention comprises from about 5 percent by weight (pbw) to about 50 pbw of one or more of the above-described polymers in combination with from about 95 pbw to about 50 pbw of one or more optional additives, based on a total weight of the absorptive system.

b. Optional Additives

A variety of additives may be incorporated into the absorptive system of the filters of the present invention in order to provide one or more desired properties to the resulting filter. Suitable additives include reactive additives and non-reactive additives as described below.

i. Reactive Additives

One or more reactive additives (also referred to herein as "scavenging agents" or "sequestering agents") may be incorporated into the absorptive system used to form filters of the present invention. Typically, the one or more reactive additives are incorporated into the absorptive system to form a uniform distribution of reactive additives within the polymer matrix. Alternatively, one or more reactive additives may be positioned within the absorptive system such that a non-uniform distribution of reactive additives is present. For example, a layer of reactive additives may be positioned between two outer layers of polymer material, or an outer surface of the polymeric material may be coated with one or more reactive additives. In other embodiments, a layer of reactive additives may be present separate from the polymer matrix of the absorptive system.

A variety of reactive additives may be used in the present invention. Suitable reactive additives include, but are not limited to, catalytic reactants, stoichiometric reactants, catalytic/stoichiometric reactants, acid-scavenging agents, base-scavenging agents, reactive nanoparticles, or a combination thereof. Suitable catalytic reactants include, but are not limited to, strong acids, strong bases, transition metals (e.g., Cu), transition metal salts (e.g., cupric chloride), or a combination thereof. Suitable stoichiometric reactants include, but are not limited to, strong acids (e.g., sulfonic acid, some carboxylic acids, phosphoric acids, and some benzoic acids), weak acids (e.g., some carboxylic acids, and some benzoic acids), strong bases (e.g., NaOH), weak bases (e.g., ethylenediamine, amines, and Na$_2$CO$_3$), primary amines (e.g., triethylamine), or a combination thereof. Water may also be considered a reactive additive due to its interaction with the polymer matrix when acidic or basic reactive additives are present.

In one desired embodiment of the present invention, the reactive additives comprise functionalized ethylenediamine beads. The functionalized ethylenediamine beads may be ethylenediamine beads that have one or more amine groups replaced with another functional group. Suitable substitute functional groups include, but are not limited to, trialkyl amine moieties having a chemical structure of —NR$_1$R$_2$R$_3$ wherein each R group can independently comprise a hydrogen or an alkyl group having up to about 8 carbon atoms, and at least one R group is not hydrogen; a halogen moiety, such as —F; and an acid anion moiety, such as formic acid anion (—COO$^-$).

When present within the absorptive system, the reactive additives react with one or more volatile contaminant species absorbed into the absorptive system to form one or more non-volatile reaction products. In this embodiment, the non-volatile reaction products are permanently fixed within the absorptive system preventing escape from the absorptive system of the absorbed volatile contaminant species.

The optional reactive additives enable the production of absorptive system specifically designed to remove a desired contaminant from a fluid stream. The reactive additives provide flexibility for use in filtration applications since the resulting absorptive system is capable of at least the following reactions: (i) oxidation reactions on an outer surface of the polymer matrix, and (ii) hydrolysis reactions, acid/base reactions, condensation reactions, nucleophilic reactions, and electrophilic reactions within a bulk volume of the polymer matrix.

The above-mentioned catalytic scavenging/sequestering agents promote the reaction of one or more absorbed volatile compounds with one or more other components of an air stream, where the one or more other components include, but are not limited to, water, oxygen, and combinations thereof. Examples of reactions promoted by these catalysts include hydrolysis of esters, oxidation of aldehydes and mercaptans, decomposition of peroxides and ozone, and the like. In this embodiment, the scavenger itself is not consumed, and the amount of volatile compound scavenged may be much greater than the amount of catalytic scavenging agent(s) present.

The above-mentioned stoichiometric scavenging agents are consumed by reacting with one or more absorbed volatile compounds. Examples of stoichiometric reactions include neutralization of absorbed acids by weak and strong bases (such as reaction of caproic acid with an amine); neutralization of absorbed bases by weak and strong acids (such as neutralization of nicotine or ammonia by a sulfonic acid); chelation of volatile phosphorus compounds by metal salts (such as formation of copper phosphide by reaction of phosphine with copper salts); and the like.

In commercial and/or industrial applications, it may be desirable to remove many different volatile and semivolatile species from a fluid stream. To meet such demand, the absorptive system used to form filters of the present invention may include more than one type of reactive additive or scavenging agent in the absorptive polymeric matrix. In one desired embodiment, the absorptive system contains several different scavenging agents with the scavenging agents being catalytic, stoichiometric, or both catalytic and stoichiometric reactants. Moreover, it may be desirable to scavenge volatile and semivolatile compounds that possess non-compatible functional groups. For example, it may be desirable to scavenge both acids (such as, for example, caproic acid) simultaneously with bases (such as, for example, nicotine). The absorptive system used to form filters of the present invention may be designed to remove these disparate compounds simultaneously from an air stream by physically separating acid-scavenging agents from base-scavenging agents within the same filter.

Physical separation of incompatible reactive additives or scavenging agents may be accomplished by binding the respective acidic and basic functionalities to polymeric supports, which are physically separated from one another within the polymeric matrix (i.e., proton transport cannot take place between the physically separated supports). An even greater degree of separation can be achieved by placing multiple layers of the absorptive polymeric matrix into a combined filtration system, wherein each layer contains different, incompatible scavengers and the layers are physically separated from one another to prevent proton transport between the layers.

In one exemplary embodiment of the present invention, a combination of acid-scavenging agents and base-scavenging agents is physically present within the same absorptive system. In this embodiment, the acid-scavenging agents are physically separated from the base-scavenging agents in order to avoid premature reaction with one another within the absorptive system. As described above, layers of specific reactive additives, such as a layer of acid-scavenging agents and a separate layer of base-scavenging agents, may be incorporated within separate layers of polymer matrix material. Alternatively, separate layers of reactive reagents, such as a layer of acid-scavenging agent and a layer of base-scavenging agent, may be present physically separated from a polymer matrix altogether.

In other embodiments of the present invention, the filters of may comprise an absorptive system containing a single polymeric matrix with acid-scavenging agents and base-scavenging agents in combination with one another and present within or in contact with the single polymeric matrix. Consequently, in some embodiments of the present invention, it is not necessary to physically separate the acid-scavenging agents and the base-scavenging agents from one another.

In a further exemplary embodiment of the present invention, reactive nanoparticles are incorporated into the absorptive system. Suitable commercially available reactive nanoparticles for use in the present invention include, but are not limited to, reactive nanoparticles available from NanoScale Materials, Inc. (Manhattan, Kans.) under the trade designation NanoActive™. At least the following NanoActive™ products may be used in the present invention: NanoActive™ Calcium Oxide, NanoActive™ Calcium Oxide Plus, NanoActive™ Cerium (IV) Oxide, NanoActive™ Magnesium Oxide, NanoActive™ Magnesium Oxide Plus, NanoActive™ Titanium (IV) Oxide, NanoActive™ Zinc Oxide, NanoActive™ Aluminum Oxide, NanoActive™ Aluminum Oxide Plus, and NanoActive™ Copper Oxide.

When present, the reactive additives are typically present in an amount of up to about 50 parts by weight based on a total weight of the absorptive system. Typically, the reactive additives are present within the absorptive system in an amount ranging from about 3 to about 30 percent by weight based on a total weight of the absorptive system.

ii. Non-Reactive Additives

The absorptive system used to form filters of the present invention may also include one or more optional non-reactive additives. Suitable non-reactive additives include, but are not limited to, water, glycerol, sorbitol, other alcohols, hygroscopic compounds, inert filler material for increasing overall surface area of absorptive system, or a combination thereof. In one desired embodiment of the present invention, the absorptive system comprises a polymer matrix containing the following components: a high molecular weight poly(acrylamide) having a weight average molecular weight ranging from about 1 million to about 50 million; a reactive additive in the form of sorbitol; and non-reactive additives comprising a combination of water and glycerol and sorbitol.

When present, the non-reactive additives may be present in an amount of up to about 50 percent by weight based on a total weight of the absorptive system used to form the filter.

2. Optional Substrates for Supporting the Absorptive System

The absorptive system used to form filters of the present invention may be applied onto an optional support or substrate to provide enhanced structural integrity to the absorptive system. Suitable substrates include, but are not limited to, non-woven fabrics, woven fabrics, knitted fabrics, films, foams, honeycomb supports (e.g., polymeric honeycombs), particulates, meshes or screens, fibers, flakes, powders, wood products, papers, glass, ceramics, beads, plywood, gypsum board, ceiling tiles, or any combination thereof. Suitable materials for forming substrates in the form of non-woven fabrics, woven fabrics, knitted fabrics, films, foams, honeycomb supports, particles, meshes, screens and fibers include, but are not limited to, polyolefins, such as polyethylene and polypropylene, polyesters, polyamides, such as Nylon 6 and Nylon 66, and cellulosics. When present, the optional substrate for supporting the absorptive system is desirably a non-woven fabric, which is coated by the absorptive system. In one desired embodiment of the present invention, the optional substrate comprises a polyamide non-woven fabric.

The amount of absorptive system coated onto a given substrate may vary depending on a number of factors including, but not limited to, the type of absorptive system, the type of substrate, and the desired use of the filter. Typically, when a substrate is present, the amount of absorptive system coating ranges from about 0.5 to about 8.0 parts by weight of coating for each part by weight of substrate. Desirably, when a substrate is present, the amount of absorptive system coating ranges from about 1.0 to about 5.0 parts by weight of coating for each part by weight of substrate, more desirably, from about 2.0 to about 3.0 parts by weight of coating for each part by weight of substrate.

The absorptive system coating may be present as a continuous or discontinuous coating on a given substrate. Desirably, the absorptive system coating is a continuous coating, which (i) encapsulates substrates such as particulates, powders, flakes, or beads, or (ii) completely coats a given surface of substrates such as films, sheets, paper, meshes, screens, fibers, foams, honeycomb, or fabrics.

3. Optional Housing for the Absorptive System

The filters of the present invention may further comprise an optional housing to provide structural integrity to the filter components. The housing may at least partially enclose one or more layers of polymeric matrix material of the filter media. The housing may be constructed of any material, which provides support for the filter components. Suitable materials for forming the housing include, but are not limited to, plastics, glass, metal, wood, ceramics, paper, cardboard, or any combination thereof. Typically, the optional housing comprises one or more housing components formed from polymers including, but are not limited to, polyolefins, such as polyethylene and polypropylene, polyesters, polyamides, such as nylon 6 and nylon 66, and cellulosics. Housing components may include, but are not limited to, a housing frame (i.e., the outer perimeter frame of a filter housing), one or more grids or screens along the fluid flow path of the filter, and a cover for allowing access to the absorptive system within the filter housing.

Figure 1B:
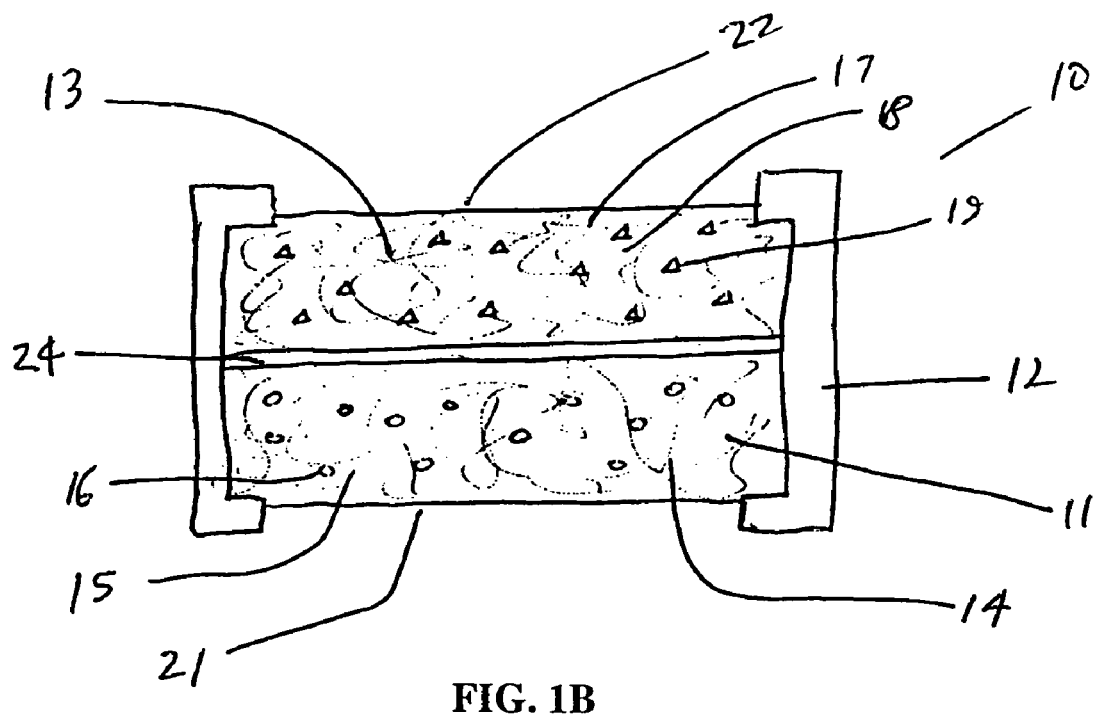
FIG. 1b provides a cross-sectional view of the exemplary filter media of FIG. 1a along line A-A.

An exemplary filter media comprising a housing is shown in FIGS. 1a-1b. As shown in FIG. 1a, exemplary filter media 10 comprises sorbent material layer 11 partially enclosed and supported by housing 12. In this embodiment, a fluid stream, such as an air stream, flows through filter media 10 entering front surface 21 and exiting rear surface 22. FIG. 1b provides a cross-sectional view of filter media 10 along line A-A as shown in FIG. 1a. As shown in FIG. 1b, exemplary filter media 10 comprises first sorbent material layer 11 and second sorbent material layer 13 partially enclosed and supported by housing 12. First sorbent material layer 11 comprises first nonwoven support 14, first polymer matrix material 15 coated onto first nonwoven support 14, and first scavenging agent 16 distributed throughout first polymer matrix material 15. Second sorbent material layer 13 comprises second nonwoven support 17, second polymer matrix material 18 coated onto second nonwoven support 17, and second scavenging agent 19 distributed throughout first polymer matrix material 18. In this exemplary embodiment, first polymer matrix material 15 may be the same as or different from second polymer matrix material 18, first scavenging agent 16 may be the same as or different from second scavenging agent 19, and first nonwoven support 14 may be the same as or different from second nonwoven support 17. As shown in FIG. 1b, gap 24 physically separates first sorbent material layer 11 from second sorbent material layer 13 to prevent possible proton transfer between first sorbent material layer 11 from second sorbent material layer 13.

Figure 2A:
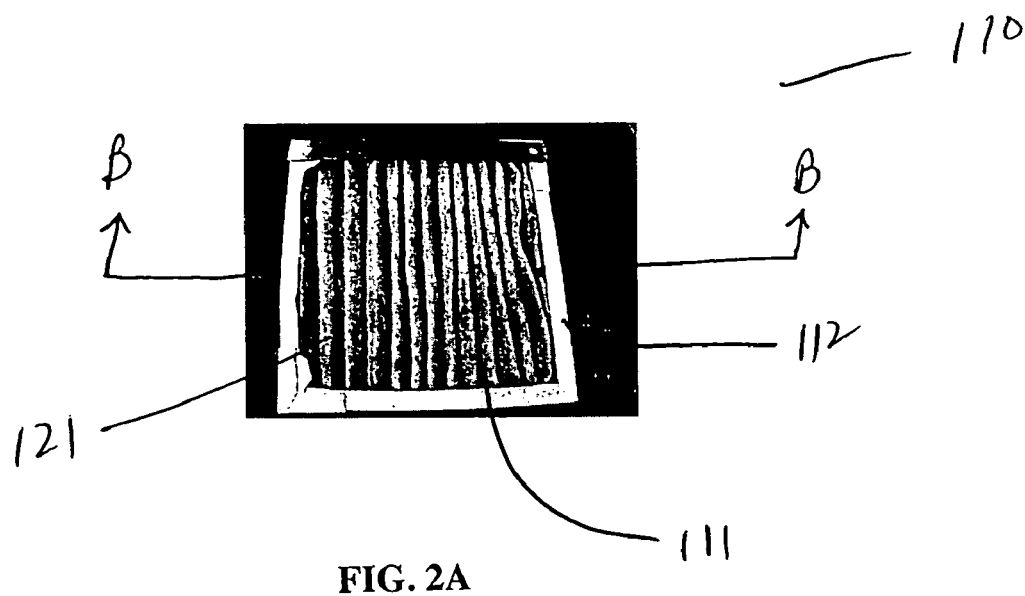
FIG. 2a depicts an exemplary filter media of the present invention.
Figure 2B:
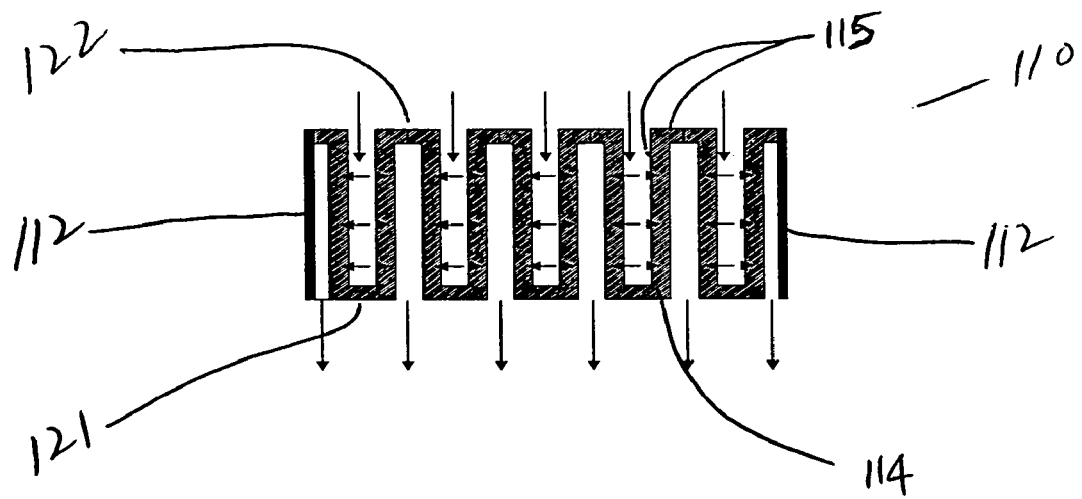
FIG. 2b provides a cross-sectional view of the exemplary filter media of FIG. 2a along line B-B.

A further exemplary filter media comprising a housing is shown in FIGS. 2a-2b. As shown in FIG. 2a, exemplary filter media 110 comprises sorbent material layer 111 partially enclosed and supported by housing 112. In this embodiment, a fluid stream, such as an air stream, flows through filter media 110 entering front surface 121 and exiting rear surface 122 (see FIG. 2b). FIG. 2b provides a cross-sectional view of filter media 110 along line B-B as shown in FIG. 2a. As shown in FIG. 2b, exemplary filter media 110 comprises first sorbent material layer 111 partially enclosed and supported by housing 112. First sorbent material layer 111 comprises support 114, polymer matrix material 115 coated onto support 114, and scavenging agent 116 (not shown) distributed throughout polymer matrix material 115.

The optional housing may comprise a housing similar to that used for activated carbon filters. In one embodiment of the present invention, glass beads having a bead diameter of up to about 5 mm, desirably from about 0.6 to about 1.5 mm, may be coated with sorbent polymeric material and then poured into a housing similar to that used for activated carbon filters. Housing for activated carbon filters typically comprise a plastic housing material (such as housing 12 as shown in FIG. 1a), a front plastic mesh or screen, and a back plastic mesh or screen for encapsulating the absorptive system (e.g., a plastic mesh or screen along outer surface 21 and one along outer surface 22 as shown in FIG. 1a).

In a further embodiment of the present invention, polymeric beads (e.g., sequestering agent in the form of beads) having a bead diameter of up to about 5 mm, desirably from about 0.6 to about 1.5 mm, may be coated with sorbent polymeric material and then poured into a housing similar to that used for activated carbon filters as described above.

C. Filter Configuration

The components of the filters of the present invention may be configured in any manner so as to remove one or more contaminants from a fluid stream. For example, in some embodiments of the present invention, a fluid stream is simply brought into contact with a filter of the present invention. Such a configuration does not require the fluid stream to pass through the absorptive system, but only come into contact with the absorptive system. An example of such a configuration is a simple coating of absorptive system onto a substrate. In other embodiments of the present invention, the fluid stream flows through the absorptive system. One example of such a filter configuration is shown in FIGS. 1a-2b as described above.

Consequently, in some aspects of the present invention, an absorptive system is simply coated onto any given surface, similar to a coating of paint, to provide a two-dimensional (i.e., film-like) absorptive filtering system. In this embodiment, the absorptive system may be coated onto any surface (interior or exterior) of a room, building, or any of the above-mentioned substrates. As a fluid stream (e.g., air) passes over the film-like coating, the two-dimensional absorptive filtering system removes unwanted components from the fluid stream.

In other embodiments of the present invention, the absorptive system is coated onto a three-dimensional structure (i.e., a nonwoven fabric or honeycomb structure) resulting in a three-dimensional absorptive filtering system. As a fluid stream (e.g., air) passes over and/or through the three-dimensional structure, the three-dimensional absorptive filtering system removes unwanted components from the fluid stream.

II. Methods of Making Filter Media

The present invention is further directed to methods of making filters. One exemplary method of making a filter of the present invention comprises forming an absorptive system, wherein the absorptive system comprises one or more polymeric materials. Each of the one or more polymeric materials may be formed using any known polymerization technique including, but not limited to, free radical polymerization, anionic polymerization, cationic polymerization, and condensation polymerization. Additives including reactive and non-reactive additives may be blended with the one or more polymeric materials. When applicable, the blended polymeric materials may be allowed to swell due to the presence of water in the absorptive system. The blended polymeric materials may be applied to a substrate using any conventional coating technique.

In one exemplary embodiment of the present invention, a filter comprising polyacrylamide, sorbitol, and sequestering agents may be prepared using one or more of the following steps:

(1) rinsing the sequestering agents with deionized water;
(2) weighing and combining polyacrylamide, sorbitol, and the sequestering agents to form a first mixture;
(3) blending the first mixture for a desired amount of time, typically less than about 10 minutes;
(4) weighing and combining glycerol and deionized water to form a liquid mixture;
(5) pouring the liquid mixture into the first mixture to form a third mixture;
(6) mixing the third mixture for a desired amount of time, typically less than about three minutes to allow the polymer to begin swelling; and
(7) then coating the third mixture onto a substrate using an appropriate coating technique.

A. Coating Techniques

Suitable coating techniques for use in the present invention include, but are not limited to, dip coating, spray coating, and foam coating. An exemplary description of each of the above-referenced coating methods is given below.

1. Dip-Coating

A pre-cut, pre-cleaned non-woven material, glass beads, or polymeric beads, or any other substrate may be dipped into a polymeric sorbent mixture to coat the substrate. The substrate, such as in the case of glass beads, or polymeric beads, may be stirred to ensure an even coating on the outer surface area of the substrate. The coated substrates may be allowed to dry for a desired period of time, typically up to about 24 hours.

2. Spray-Coating

The polymeric sorbent material mixture may be diluted with water and sprayed onto a given substrate. In one embodiment using a non-woven fabric substrate, the non-woven fabric substrate is washed in 30 wt % aqueous hydrogen peroxide ($H_2O_2$) for about five minutes. Excess $H_2O_2$ is allowed to drain from the non-woven fabric substrate. After drying, the diluted polymeric sorbent material mixture is sprayed onto the dry non-woven material using a high-pressure sprayer connected to a high-pressure compressed gas source. The coated substrate is allowed to dry for a period of time, typically about an hour, and then resprayed using the same procedure if so desired. The drying time may be faster by using heat lamps.

3. Foam Coating

The polymeric sorbent material mixture may be exposed to bubbling carbon dioxide ($CO_2$) during an initial swelling period (i.e., during step (6) discussed above) to create a foam coating. A pre-cut, pre-cleaned filter material substrate may be dipped into or brought into contact with the foam to coat the filter media substrate. Once a sufficient amount of coating has coated the filter media substrate, the coated substrate is allowed to dry and complete swelling for a desired period, typically up to about 24 hours.

B. Other Possible Method Steps

The exemplary method of making a filter of the present invention may further comprise one or more of the following steps:

(1) selecting a polymer matrix material based on diffusivity and/or $T_g$;
(2) selecting a polymer matrix material having (i) a diffusivity of greater than $10^{-8}$ cm$^2$/sec, and (ii) a $T_g$ of less than about 20° C.;
(3) selecting one or more reactive additives to be combined with one or more polymer matrix materials;
(4) selecting one or more non-reactive additives to be combined with one or more polymer matrix materials;
(5) combining one or more reactive additives with one or more polymer matrix materials;
(6) combining one or more non-reactive additives with one or more polymer matrix materials;
(7) distributing one or more reactive additives within one or more polymer matrices;
(8) positioning one or more reactive additives proximate to, but separate from, one or more polymer matrices;
(9) distributing one or more non-reactive additives within one or more polymer matrices;
(10) positioning one or more non-reactive additives proximate to, but separate from, one or more polymer matrices;
(11) incorporating one or more incompatible reactive additives into the same filter media;
(12) physically separating one or more incompatible reactive additives from one another within the same filter media;
(13) incorporating a first reactive additive into a first polymer matrix material, and incorporating a second reactive additive into a second polymer matrix material, wherein the first reactive additive is incompatible with the second reactive additive;
(14) combining a sorbent material with an optional substrate;
(15) coating at least one polymeric matrix material onto an optional substrate during one or more coating steps;
(16) drying a coating applied to an optional substrate;
(17) foaming at least one polymeric matrix material; and
(18) incorporating at least one polymeric matrix material into an optional housing.

It should be understood that the methods of making filters of the present invention may include one or more of any of the above-described method steps. For example, multiple coating steps may be used to increase the amount of a given coating on a given substrate or to provide multiple different coatings on a given substrate. Further, multiple drying steps may be used to provide intermediate and final dried coatings on a given substrate.

III. Methods of Using Filter Media to Remove One or More Contaminants

The present invention is also directed to methods of using filters to remove particles and/or one or more of the above-described contaminants from a fluid stream. One exemplary method for removing particles and/or one or more volatile or semivolatile compounds from a fluid stream comprises bringing the fluid stream and a filter of the present invention in contact with one another. As discussed above, the contacting step may simply require the fluid stream to contact a portion of the absorptive system. In some embodiments, the contacting step may comprise passing the fluid stream through a portion of the absorptive system.

The exemplary method for removing one or more volatile or semivolatile compounds from a fluid stream may further comprise one or more of the following steps:

(1) positioning a filter media of the present invention proximate to a fluid stream;

(2) incorporating a filter media of the present invention into an air filtration system;

(3) incorporating a filter media of the present invention into an air filtration system, wherein the air filtration system comprises a face mask, a body suit, an air conditioning system, ductwork of a building or vehicle, an air recirculation system of a vehicle or airplane, a military vehicle, or a combination thereof;

(4) matching specific components of the filter media with specific contaminants or compounds that are to be removed from a fluid stream; and (5) making a filter media to specifically remove a given contaminant or compound.

Selection of particular absorptive polymeric matrices and scavenger systems is dependent on the end-use criteria for the fluid (e.g. air) filtration system. In some applications, removal of trace amounts of volatile and semivolatile compounds may be desired, while in other applications the ability to remove high concentrations of one or more contaminants or compounds may be desired. Other performance criteria may include, but are not limited to, the temperature and humidity of the incoming air, the expected service life of the absorptive polymeric matrix, the cost of the total absorption system, the degree of one-pass removal desired, and whether the filter is expected to be reused, or merely replaced. In general, selected polymeric matrices fall into two broad classes: hydrophilic media, and hydrophobic media.

Examples of hydrophobic polymeric matrices suitable for use in the present invention include, but are not limited to, poly(dimethylsiloxane), wherein the poly(dimethylsiloxane) is optionally swollen with silicone oil, or other relatively fluid diluents. These systems are inherently more suitable for applications where maintenance a low humidity level in the air stream is preferred, such as in some semiconductor processing operations.

Examples of hydrophilic polymeric matrices suitable for use in the present invention include, but are not limited to, poly(acrylamide), wherein the poly(acrylamide) is swollen with water, water/glycerol, water/glycero/sorbitol, water/sorbitol, water/salt, or water/glycerol/salt mixtures. These systems are inherently of low cost, possess high diffusivities, have high capacities, and provide an aqueous environment wherein scavenging chemistries may occur.

To maximize the effectiveness of a given scavenging system, it is desirable for there to be both a kinetically acceptable rate of reaction, and sufficient thermodynamic driving force. While the thermodynamic driving force can, in principle, be provided simply through concentration effects (i.e., increased concentration of a given scavenging agent within an absorptive system), at least some scavenging systems inherently possess a significant heat of reaction. An additional benefit of hydrophilic polymer matrices is that any heat generated by the scavenging reaction is absorbed by the large amount of contained water, thus limiting any temperature rise. In addition, vaporization of water from the polymeric matrix will further compensate for any heat of reaction; thus, these systems are expected to inherently possess a temperature-control feature. This feature minimizes and/or eliminates the need for incorporation into the filter design specific heat-radiating members, such as those disclosed in known adsorptive-type filtration systems.

IV. Other Filter Media of the Present Invention

While a desired embodiment of the present invention is to provide a hydrophilic or hydrophobic polymeric matrix possessing a diffusion constant for the selected absorbents of greater than about $1 \times 10^{-8}$ cm$^2$/sec, which optionally contains selected scavenging agents, in another embodiment of the present invention the hydrophobic or hydrophilic matrix is absent, and the scavenging agents alone are employed for sequestering volatile and semivolatile compounds. In both of these embodiments, there is sufficient liquid medium present within the scavenging agents to provide a medium for liquid-phase reactions to occur.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

TEST METHODS

The following test methods may be used to evaluate one or more characteristics of the filter media of the present invention.

Sequestering Agent/Small Chamber Filter Test

Figure 4:
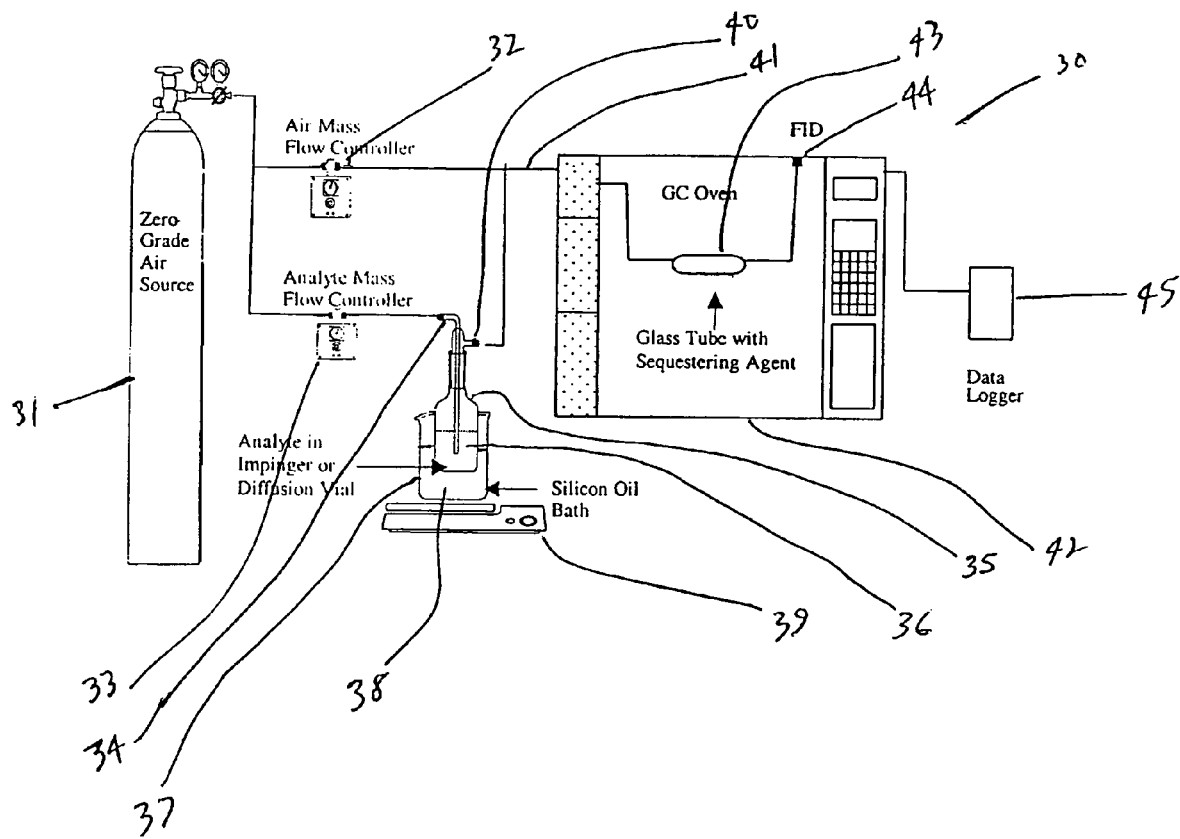
FIG. 4 depicts a schematic of an exemplary sequestering agent test apparatus used in the Examples.
Figure 5:
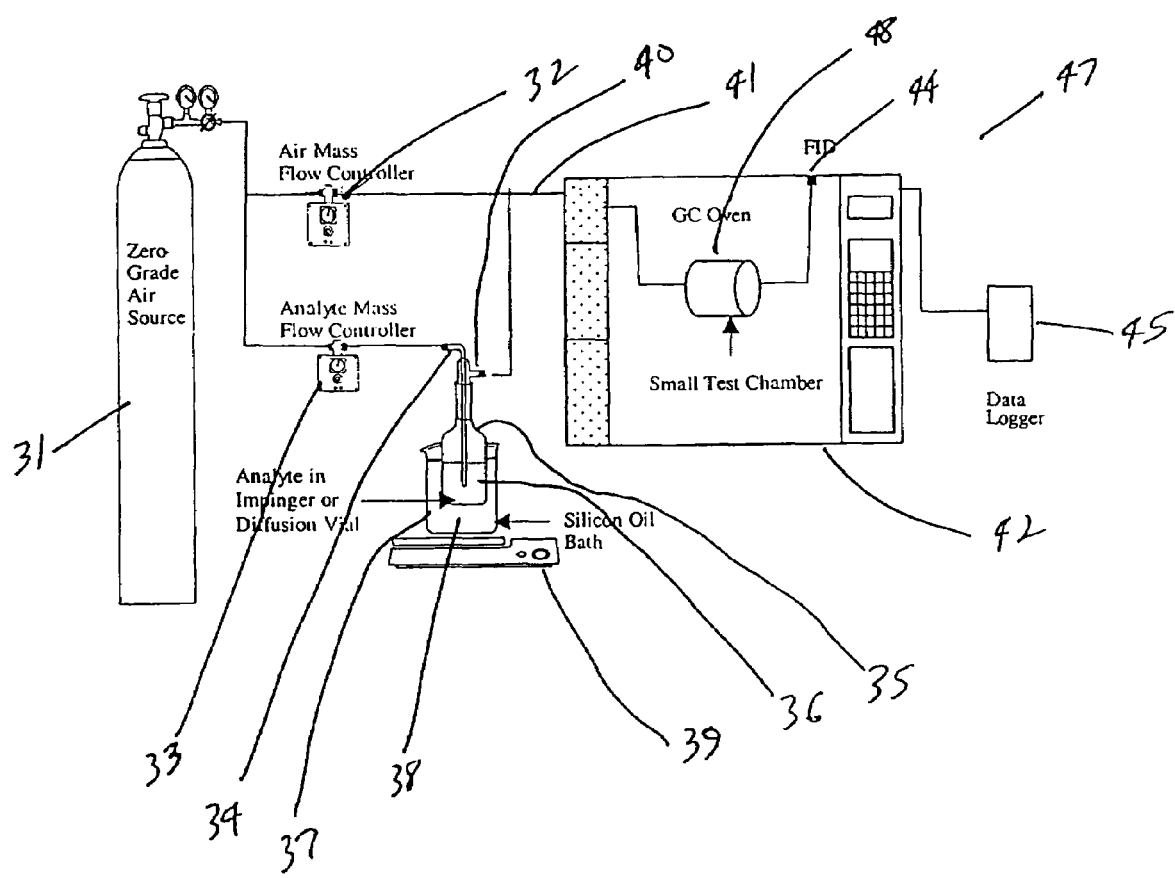
FIG. 5 depicts a schematic of an exemplary coated filter test apparatus used in the Examples.

A gas chromatograph, equipped with a flame ionization detector (GC-FID), or other appropriate detector, may be retrofitted to perform sequestering agent testing in quartz tubes (see FIG. 4) or filter testing in a small chamber (see FIG. 5). A bubbler system using mass flow controllers is connected to a source of zero-grade air and a midget impinger, in a silicon oil bath, filled with a liquid analyte of interest. The impinger's exhaust outlet is connected to a mixing tee. The GC oven is maintained at 40° C. during the analysis, and data is collected using a data logger. The challenge gas' relative humidity is recorded prior to testing, and adjusted to the desired set point by adjusting the flows of analyte and humidified air. Approximately 0.5 g of sequestering agent to be tested is introduced into a 2 mm ID, ¼" OD quartz tube, and held in place by two glass wool plugs (see FIG. 4) or a small stainless-steel chamber (see FIG. 5) with an internal diameter of 47 mm.

Absorption Capacity/Efficiency Test

Figure 3A:
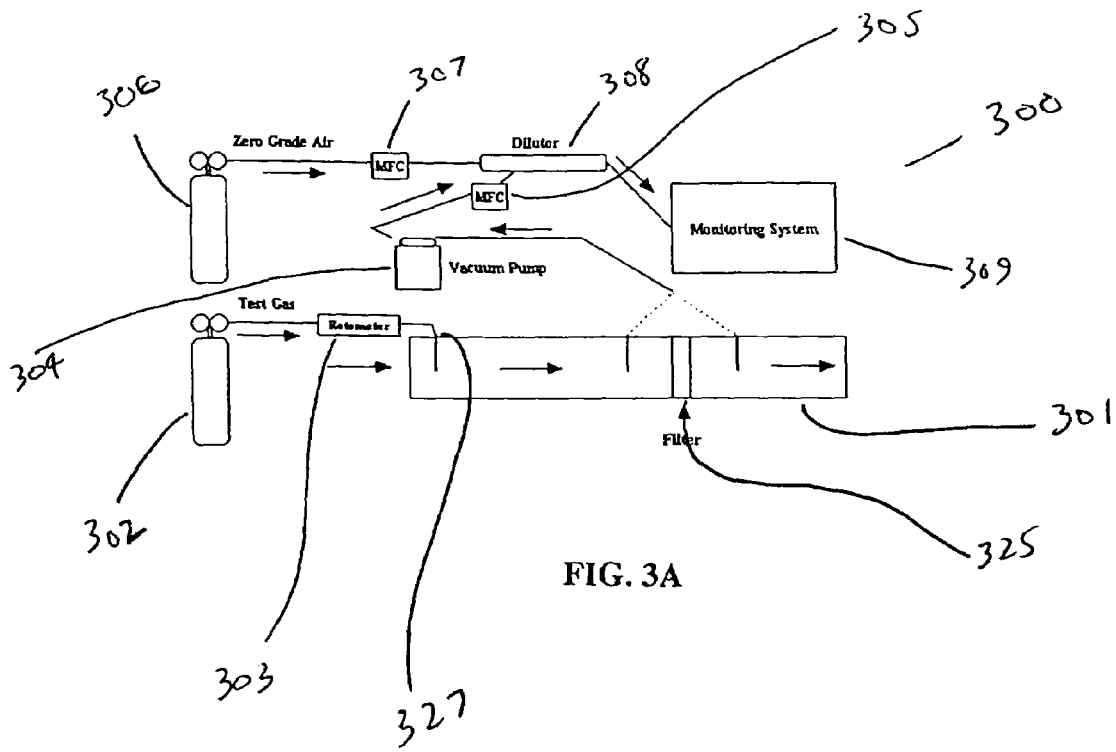
FIG. 3a depicts a schematic of an exemplary complete 30.5 cm (1 foot)×30.5 cm (1 foot) testing system for measuring the absorption of a given filter media.

The absorption capacity and efficiency of a given filter may be measured as follows using a 30.5 cm (1 foot)×30.5 cm (1 foot) test duct system. An exemplary 30.5 cm (1 foot)×30.5 cm (1 foot) test duct system is shown in FIG. 3a.

Exemplary test duct system 300 comprises duct 301, test gas supply 302, rotometer 303, vacuum pump 304, test sample mass flow controller 305, zero grade air supply 306, air mass flow controller 307, dilutor 308, and monitoring system 309. A more detailed schematic of duct 301 is shown in FIG. 3b.

Figure 3B:
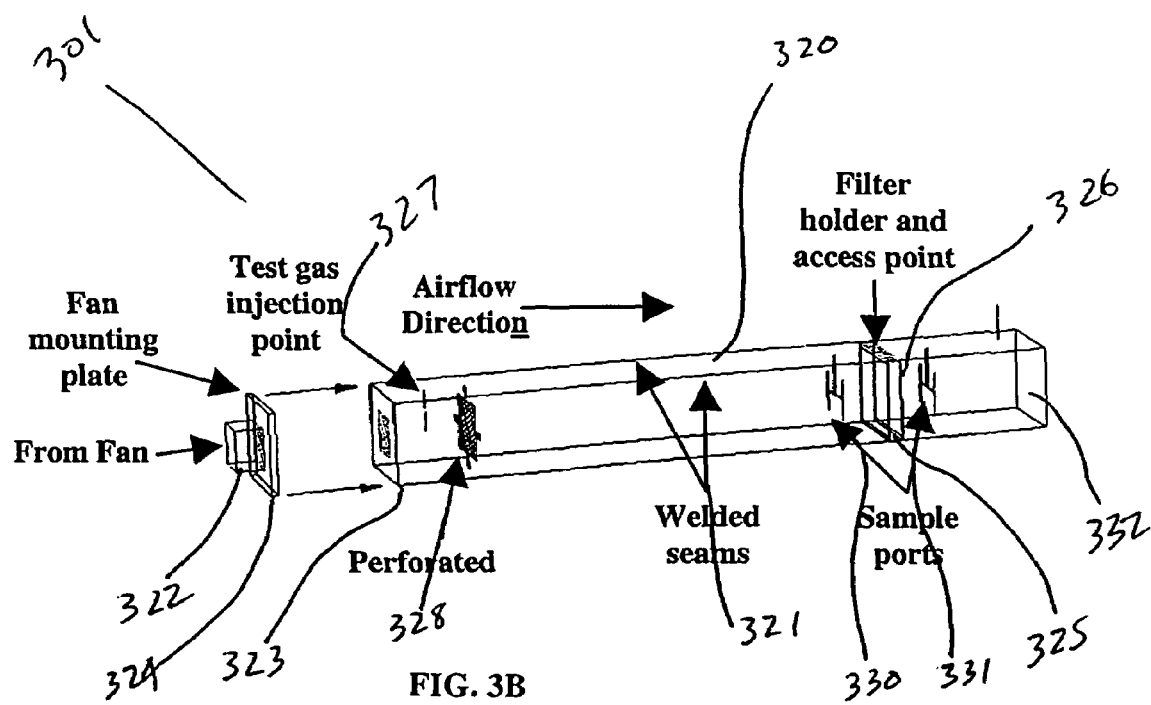

As shown in FIG. 3b, duct 301 comprises a sheet of eight-foot stainless steel sheet 320 formed into a square duct 301 and welded along top seams 321 with a blower fan 322 on fan mounting plate 324 at end 323. Fan 322 creates a positive pressure airflow through the duct 301 and test filter 325 positioned within test filter holder 326. An injection port 327 is positioned approximately one foot downstream of fan 322. An eight-inch square perforated plate 328 is positioned approximately six inches downstream of injection port 327. Test filter holder 326 comprises a two-inch deep filter bracket, and is positioned approximately six and half feet downstream from fan 322.

In operation, samples are collected at upstream sample port 330 and downstream sample port 331 located on either side of test filter 325. The air flow in duct 301 is controlled by varying the fan speed and air intake to fan 322. Test filters 325 are inserted into test filter holder 326 for two-inch filters, or installed from open exhaust end 332 of test duct 301 and secured to a downstream filter bracket of test filter holder 326. Test gas is injected into duct 301 and measured upstream and downstream of the filter 325 as required.

Two separate fluid streams, one from upstream sample port 330 and one from downstream sample port 331, are collected through vacuum pump 304, test sample mass flow controller 305 and dilutor 308. Monitoring system 309 detects the test gas concentration in the two separate fluid streams, and provides output relating to the absorption of a given test gas within a given test filter 325. The removal effectiveness is calculated from comparison of the upstream and downstream concentrations of the challenge gas.

Water Content Test Using Thermogravimetric Analysis

A Thermogravimetric/Differential Thermal Analyzer (TG/DTA) may be used to determine the water content of the gel. The TG/DTA uses two matched analytical balance arms inside a temperature-controlled furnace to measure weight loss versus temperature of small samples. Aluminum sample pans, approximately 2 mm in size, are used to hold the samples. An empty pan is placed on one of the balance arms for a reference and an empty pan is place on the other balance arm in order to tare the instrument. The sample pan is removed and a small sample having a sample weight of approximately 10 to 50 mg is placed in the sample pan. The furnace is sealed around the balance arms and a flow of argon is established through the furnace in order to create an inert environment and sweep gases produced during the analysis. The analysis is started and the furnace ramps from 25° C. to 400° C. at 25° C. per minute. The computer records weight loss versus temperature to produce a graph that can be analyzed to determine free and bound water loss.

Typically, the loss of free water and other volatiles is at a relatively constant rate from 25° C. to just over 100° C., and then there is a rapid loss of weight in the sample corresponding to the loss of bound water in a given polymeric mixture sample. These marked changes in the weight of the polymeric mixture sample are used to determine the percent weight loss, which corresponds to the volatile and free water content, and the bound water content of the polymeric mixture sample.

Water Retention Test

Water retention may be measured by measuring changes in viscosity over temperature and time. Viscosity measurements are made using a CSR-10 rheometer with extended temperature option. Tests are run (i) at constant temperature (25° C.) with various shear rates (0.5 to 5.0 s$^{-1}$) and (ii) constant shear rate (1.0 s$^{-1}$) with various temperatures (10 to 40° C.). For all tests, a 20 mm parallel plate is used as the measuring device with a gap setting of 1 mm. Additionally, the tests are repeated with various batches of polymeric media over a thirty-day time period to ascertain the changes in viscosity (and water retention) over time.

EXAMPLES

The following examples provide a description of exemplary filter media of the present invention.

Filter Materials

The materials shown in Table 1 were used in the examples below.

TABLE 1

Materials Used In Examples

| Material | Description | Manufacturer/Source |
|---|---|---|
| Sorbent Materials | | |
| poly(acrylamide) | polymer having a MW$_w$ of about 1 million to about 50 million | Vulcan Chemicals Columbus, GA |
| Reactive Additives | | |
| DOWEX ® HCR-S resins | 20-50 mesh | Sigma-Aldrich Chicago, IL |
| DOWEX ® 50WX-8 resins | 200-400 mesh | Sigma-Aldrich Chicago, IL |
| DOWEX ® 550A resins | 20-50 mesh | Sigma-Aldrich Chicago, IL |
| DOWEX ® 1 × 2 resins | 200-400 mesh | Sigma-Aldrich Chicago, IL |
| DOWEX ® chloromethylated resin ethylene diamine functionalized | 200-400 mesh | Sigma-Aldrich Chicago, IL |
| Non-Reactive Additives | | |
| glycerin | glycerin (99.5%) | Lonza, Inc. Fairlawn, TX |
| sorbitol | sorbitol | Sigma-Aldrich Chicago, IL |
| Substrates | | |
| aluminum mesh filter substrate | nonwoven fabric | DuPont Chemical Company Wilmington, DE |
| glass beads | 0.6, 0.8, and 1.5 mm beads | Sigma-Aldrich Chicago, IL |
| INTREPID ™ fabric | nonwoven fabric | Kimberly-Clark Roswell, GA |

TABLE 1-continued

Materials Used In Examples

| Material | Description | Manufacturer/Source |
|---|---|---|
| DEFIANT ™ fabric | nonwoven fabric | Kimberly-Clark Roswell, GA |
| cotton woven material | cotton woven material | Home Depot Atlanta, GA |
| nylon string | nylon string | Home Depot Atlanta, GA |
| steel wool mesh | steel wool mesh | The 3M Company St. Paul, MN |
| NOMEX ® honeycomb | polymeric honeycomb | Texas Almet, Inc. Arlington, TX |

Example 1

Preparation of a Filter Media-evaluation of Reactive Additives

The effectiveness of strong acids and bases at scavenging a variety of volatile and semivolatile compounds was evaluated using the "Sequestering Agent/Small Chamber Filter Test" method described above and apparatus 30 as shown in FIG. 4. Apparatus 30 comprised the following components: zero-grade air source 31, air mass flow controller 32, analyte mass flow controller 33, vial inlet tubing 34, vial 35, analyte 36 within vial 35, beaker 37, silicone oil bath 38 with beaker 37, hot plate 39, vial outlet tubing 40, oven inlet tubing 41, oven 42, glass tube 43 with sequestering agent, flame ionization detector (FID) 44, and microprocessor (i.e., data logger) 45.

In this example, a strong acid was present as sulfonated styrene/divinylbenzene beads, and a strong base was present as trimethylbenzyl ammonium-functionalized styrene/divinylbenzene beads. Furthermore, a basic bead with primary and secondary amines that was easily chelated with copper was also tested as a suitable reactive additive. The basic bead was an ethylenediamine derivative of chloromethylated styrene/divinylbenzene beads.

To test the efficacy of these sequestering agents, glass tubes 43 were packed with the sequestering agents and were mounted downstream of an airflow containing a given concentration of volatile or semivolatile compound as indicated in Table 2 below. Determination of the fractional removal was accomplished by comparing the magnitude of the signal obtained from a flame ionization detector 44 coupled to the effluent of the glass tubes 43 with and without the contained test scavenger.

TABLE 2

Sequestering Agent Effectiveness Against Selected Volatile and Semivolatile Organic Compounds.

| Sample No. | Functional Group on Scavenger | Rel. Hum. (%) | Temp. (° C.) | Challenge Analyte | Conc. (ppm) | Percent Capture (%)[2] |
|---|---|---|---|---|---|---|
| 1 | Sulfonic Acid; 200-400 Mesh (Acid Washed) | 50 ± 10 | 40 ± 2 | 2-Vinylpyridine | 2,000 | 94.04 |
| 2 | Trimethylbenzyl Ammonium 200-400 Mesh (Acid Washed) | 50 ± 10 | 40 ± 2 | 2-Vinylpyridine | 2,000 | 94.04 |
| 3 | Molecular Sieves Organophilic (Dry) | 50 ± 10 | 40 ± 2 | Acetaldehyde | 2,000 | 99.99 |
| 4 | Ethylene Diamine Functionalized Beads | 50 ± 10 | 40 ± 2 | Acetaldehyde | 2,000 | 22.86 |
| 5 | Trimethylbenzyl Ammonium 200-400 Mesh (Acid Washed) | 50 ± 10 | 40 ± 2 | o-Cresol | 2,000 | 98.28 |
| 6 | Sulfonic Acid 200-400 Mesh (Acid Washed) | 50 ± 10 | 40 ± 2 | Nicotine | 2,000 | 85.24 |
| 7 | Trimethylbenzyl Ammonium 200-400 Mesh (Acid Washed) | 50 ± 10 | 40 ± 2 | Nicotine | 2,000 | 91.06 |
| 8 | Sulfonic Acid 200-400 Mesh (Acid Washed) | 50 ± 10 | 40 ± 2 | Pyrrole | 4,000 | 99.41 |

TABLE 2-continued

Sequestering Agent Effectiveness Against Selected Volatile and Semivolatile Organic Compounds.

| Sample No. | Functional Group on Scavenger | Rel. Hum. (%) | Temp. (° C.) | Challenge Analyte | Conc. (ppm) | Percent Capture (%)[2] |
|---|---|---|---|---|---|---|
| 9 | Trimethylbenzyl Ammonium 200-400 Mesh (Acid Washed) | 50 ± 10 | 40 ± 2 | Pyrrole | 4,000 | 99.44 |
| 10 | Molecular Sieves Organophilic (Dry) | 50 ± 10 | 40 ± 2 | Pyrrole | 4,000 | 99.99 |
| 11 | Sulfonic Acid; 20-50 Mesh (Acid Washed) | 50 ± 10 | 40 ± 2 | Ammonia | 1625 | 94.0 |
| 12 | Sulfonic Acid; 200-400 Mesh (Dry) | 50 ± 10 | 40 ± 2 | 2-Vinylpyridine | 2,000 | 96.17 |
| 13 | Molecular Sieves Organophilic (Dry) | 50 ± 10 | 40 ± 2 | 2-Vinylpyridine | 2,000 | 98.51 |
| 14 | Sulfonic Acid; 200-400 Mesh (Dry) | 50 ± 10 | 40 ± 2 | o-Cresol | 2000 | 97.27 |
| 15 | Molecular Sieves Organophilic (Dry) | 50 ± 10 | 40 ± 2 | Nicotine | 2000 | 98.32 |
| 16 | Molecular Sieves Organophilic (Dry) | 50 ± 10 | 40 ± 2 | Pyrrole | 2000 | 99.99 |
| 17 | Sulfonic Acid; 200-400 Mesh (Acid Washed) | 0 | 40 ± 2 | Ammonia | 473 | 99.0 |
| 18 | Trimethylbenzyl Ammonium 200-400 Mesh | 0 | 40 ± 2 | Chlorine | 13,000 | 98 |
| 19 | Sulfonic Acid; 200-400 Mesh (Acid Washed) | 50 ± 10 | 40 ± 2 | Neutral Toxic Industrial Chemical | 2000 | 71 |
| 20 | Sulfonic Acid; 200-400 Mesh (Acid Washed) | 50 ± 10 | 40 ± 2 | Acidic Toxic Industrial Chemical | 500 | 99 |
| 21 | Sulfonic Acid; 200-400 Mesh (Acid Washed) | 50 ± 10 | 40 ± 2 | Chemical Warfare Agent Simulant | 11,000 | 93.07 |
| 22 | Magnesium Oxide Nanoparticles | 0 ± 10 | 40 ± 2 | 2-Vinylpyridine | 121 | 0.00 |
| 23 | Magnesium Oxide Nanoparticles | 0 ± 10 | 40 ± 2 | Acetaldehyde | 1700 | 23.72 |

[2] Percent capture results based on one-hour testing at the specified challenge gas concentration.

Example 2

Preparation of a Filter Media

The sulfonic acid beads (DOWEX® 50WX-8 resin beads) used in Example 1 were imbedded into a matrix of polyacrylamide to form a sorbent filter material as described below. 2.5 g of sulfonic acid beads were washed with deionized water. 2.5 g of polyacrylamide, 11 g of sorbitol, and the washed sulfonic acid beads were combined in a mixing vessel to form a first mixture. The first mixture was blending for about 3 minutes.

In a separate container, 14 g of glycerol and 23 g of deionized water were mixed to form a liquid mixture. The liquid mixture was then poured into the first mixture to form a third mixture, and mixed for about three minutes to allow the polymer to begin swelling. The polyacrylamide mixture was dip-coated onto aluminum mesh filters to provide coated filters having a coating weight of from 2.0 to 6.0 g coating/0.7 g of filter material. The coated filters were then stacked into a small chamber, which was fitted onto an apparatus as depicted in FIG. 5, and tested for effectiveness against selected volatile and semivolatile organic compounds using the "Sequestering Agent/Small Chamber Filter Test" method described above. The results are given below in Table 3.

Apparatus 47 shown in FIG. 5 comprises the following components: zero-grade air source 31, air mass flow controller 32, analyte mass flow controller 33, vial inlet tubing 34, vial 35, analyte 36 within vial 35, beaker 37, silicone oil bath 38 with beaker 37, hot plate 39, vial outlet tubing 40, oven inlet tubing 41, oven 42, test chamber 48 containing sample filter media (not shown), flame ionization detector (FID) 44, and microprocessor 45.

TABLE 3

Coated Filter Effectiveness Against Selected Volatile and Semivolatile Organic Compounds

| Sample No. | Functional Group on Scavenger | Rel. Hum. (%) | Temp. (° C.) | Challenge Analyte | Conc. (ppm) | Percent Capture (%)[3] |
|---|---|---|---|---|---|---|
| 1 | Sulfonic Acid 20-50 Mesh (dry) on Al mesh | 0 ± 10 | 40 ± 2 | 2-Vinylpyridine | 121 | 85.3 |
| 2 | Sulfonic Acid 20-50 Mesh on Al mesh | 0 ± 10 | 40 ± 2 | Acetaldehyde | 1,700 | 23.7 |

[3]Percent capture results based on one-hour testing at the specified challenge gas concentration.

Example 3

Preparation of Various Filter Media

An absorptive system was prepared as described in Example 2. The absorptive system was applied to a variety of substrates as shown in Table 4, and tested as described in Example 2.

TABLE 4

Coated Filter Effectiveness Against Selected Volatile and Semivolatile Organic Compounds

| Sample No. | Functional Group on Scavenger | Rel. Hum. (%) | Temp. (° C.) | Challenge Analyte | Conc. (ppm) | Percent Capture (%)[3] |
|---|---|---|---|---|---|---|
| 1 | Sulfonic Acid 20-50 Mesh (dry) on Cotton woven material | 0 ± 10 | 40 ± 2 | 2-Vinylpyridine | 121 | 78.30 |
| 2 | Sulfonic Acid 20-50 Mesh (dry) on Nylon fiber | 0 ± 10 | 40 ± 2 | 2-Vinylpyridine | 121 | 89.60 |

TABLE 4-continued

Coated Filter Effectiveness Against Selected Volatile and Semivolatile Organic Compounds

| Sample No. | Functional Group on Scavenger | Rel. Hum. (%) | Temp. (° C.) | Challenge Analyte | Conc. (ppm) | Percent Capture (%)[3] |
|---|---|---|---|---|---|---|
| 3 | Foamed gel coated on Al mesh filter | 50 ± 10 | 40 ± 2 | 2-Vinylpyridine | 300 | 54 |
| 4 | Foamed gel coated on steel mesh filter | 50 ± 10 | 40 ± 2 | 2-Vinylpyridine | 300 | 70 |

Example 4

Preparation of Various Filter Media

A number of filters were prepared using the procedure as outlined in Example 2 except the sulfonic acid beads (DOWEX® 50WX-8 resin beads) were replaced with each of the DOWEX® resin beads shown in Table 1 above.

Example 5

Preparation of Various Filter Media

An absorptive system was prepared as described in Example 2. The absorptive system was applied to a variety of substrates as shown in Table 5 below, and tested for capacity (mg of captured analyte per grams of absorptive system material) using the procedure as described in Example 2.

TABLE 5

Coated Filter Capacity Against Selected Volatile and Semivolatile Organic Compounds

| Sample No. | Functional Group on Scavenger | Rel. Hum. (%) | Temp. (° C.) | Challenge Analyte | Conc. (ppm) | Capacity (mg/g) |
|---|---|---|---|---|---|---|
| 1 | Sulfonic Acid 400 mesh coated on INTREPID ™ fabric | 50 ± 10 | 40 ± 2 | Chemical Warfare Agent Simulant | 400 | 61.6 |
| 2 | Sulfonic Acid 20-50 mesh coated on NOMEX ® honeycomb | 50 ± 10 | 40 ± 2 | Chemical Warfare Agent Simulant | 161 | 37.9 |
| 3 | Sulfonic Acid 20-50 mesh coated on 0.6 mm glass beads | 50 ± 10 | 40 ± 2 | 2-Vinylpyridine | 2085 | 306.5 |
| 4 | Sulfonic Acid 20-50 mesh coated on 1.5 mm glass beads | 50 ± 10 | 40 ± 2 | 2-Vinylpyridine | 2167 | 162.0 |
| 5 | Sulfonic Acid 200-400 mesh coated on 0.6 mm glass beads | 50 ± 10 | 40 ± 2 | 2-Vinylpyridine | 2167 | 360.5 |
| 6 | Sulfonic Acid 200-400 mesh coated on 1.5 mm glass beads | 50 ± 10 | 40 ± 2 | 2-Vinylpyridine | 2167 | 162.0 |

TABLE 5-continued

Coated Filter Capacity Against Selected Volatile and Semivolatile Organic Compounds

| Sample No. | Functional Group on Scavenger | Rel. Hum. (%) | Temp. (° C.) | Challenge Analyte | Conc. (ppm) | Capacity (mg/g) |
|---|---|---|---|---|---|---|
| 7 | Gel-coated Sulfonic Acid Beads 20-50 mesh on INTREPID ™ fabric | 50 ± 10 | 40 ± 2 | ammonia | 1625 | 101.3 |
| 8 | Strongly Basic Beads 200-400 mesh on DEFIANT ™ fabric | 50 ± 10 | 40 ± 2 | Sulfur Dioxide | 600 | 127.9 |
| 9 | Functionalized ethylene-diamine beads on DEFIANT ™ fabric | 50 ± 10 | 40 ± 2 | Sulfur Dioxide | 600 | 314.6 |
| 10 | Copper chelated ethylene-diamine beads on DEFIANT ™ fabric | 50 ± 10 | 40 ± 2 | Sulfur Dioxide | 600 | 38.5 |

Example 6

Preparation of Filter Media

A number of filters were prepared using the procedure as outlined in Example 2 except the polyacrylamide was replaced with equal amounts of the following polymers as shown in Table 6 below.

TABLE 6

Combinations of Polymeric Matrix Materials and Additives To Form Absorptive Systems Starting Materials

| Sample No. | Polymer Material | Wt Polymer (g) | Additives | Wt Additives (g) |
|---|---|---|---|---|
| 1 | polyethylene/ polypropylene random copolymer | 2.5 | Sulfonic Acid Sorbitol Glycerol Water | 2.5 11.0 14.0 23.0 |
| 2 | polyethylene glycol | 2.5 | Sulfonic Acid Sorbitol Glycerol Water | 2.5 11.0 14.0 23.0 |
| 3 | styrene-butadiene random copolymer | 2.5 | Sulfonic Acid Sorbitol Glycerol Water | 2.5 11.0 14.0 23.0 |
| 4 | poly(dimethylsiloxane) | 2.5 | Sulfonic Acid Sorbitol Glycerol Water | 2.5 11.0 14.0 23.0 |

Example 7

Preparation of a Filter Media

An absorption system was prepared as described in Example 2. The polyacrylamide mixture was spray-coated onto glass beads having a bead size of 0.6 mm (see Sample 5 in Table 5). The coated glass beads were poured into a rectangular-shaped plastic housing (45.7 cm×45.7 cm×2.54 cm) having outer mesh screens on outer surfaces (i.e., the 45.7 cm×45.7 cm surfaces).

Example 8

Preparation of a Filter Media

An absorption system was prepared as described in Example 2. The polyacrylamide mixture was spray-coated onto glass beads having a bead size of 0.6 mm (see Sample 8 in Table 5). The coated nonwoven fabric was positioned into a rectangular-shaped plastic housing (45.7 cm×45.7 cm×2.54 cm) having outer mesh screens on outer surfaces (i.e., the 45.7 cm×45.7 cm surfaces).

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A gas filter for removing a contaminant from a gas comprising an absorptive system, wherein the absorptive system comprising:
   a polymer matrix; and
   one or more reactive additives, wherein the absorptive system comprises an absorption capacity of at least about 0.01 gram of captured contaminants per gram of the absorptive system or a water content of at least about 5 percent by weight, wherein the polymer matrix comprises a polymer having a diffusivity of greater than about $10^{-8}$ cm$^2$/sec or a $T_g$ of less than about 20° C., and wherein the absorptive system comprises a high molecular weight poly(acrylamide) having a weight average molecular weight ranging from about 1 million to about 50 million, sulfonic acid beads, sorbitol, water, and glycerol.

2. The gas filter of claim 1, wherein the polymer comprises at least one of polyethylene/polypropylene random copolymers, poly(dimethylsiloxane), styrene-butadiene random and block copolymers, and poly(vinyl chloride) plasticized with dioctyl phthalate.

3. The gas filter of claim 1, wherein the one or more reactive additives comprise catalytic reactants, stoichiometric reactants, catalytic/stoichiometric reactants, acid-scavenging agents, base-scavenging agents, reactive nanoparticles, or a combination thereof.

4. The gas filter of claim 1, wherein the one or more reactive additives comprise one or more of a transition metal, a transition metal salt, sulfonic acid, carboxylic acid, phosphoric acid, benzoic acid, NaOH, ethylene diamine, an amine, $Na_2CO_3$, and a primary amine.

5. The gas filter of claim 4, wherein the one or more reactive additives comprise reactive nanoparticles.

6. The gas filter of claim 1, wherein the one or more reactive additives are uniformly distributed throughout the polymer matrix.

7. The gas filter of claim 1, wherein the one or more reactive additives form a layer that is separate from but in contact with the polymer matrix.

8. The gas filter of claim 1, wherein the absorptive system further comprises one or more non-reactive additives.

9. The gas filter of claim 1, further comprising a substrate, wherein the absorptive system contacts at least a portion of an outer surface of the substrate.

10. The gas filter of claim 9, wherein the substrate comprises a polyolefin, a polyethylene, a polypropylene, a polyester, a polyamide, nylon 6, nylon 66, a cellulosic material, or a combination thereof.

11. The gas filter of claim 10, wherein the substrate comprises a polyamide non-woven fabric.

12. The gas filter of claim 9, further comprising a housing which at least partially holds the absorptive system, the substrate, or both.

* * * * *